Patented Jan. 30, 1951

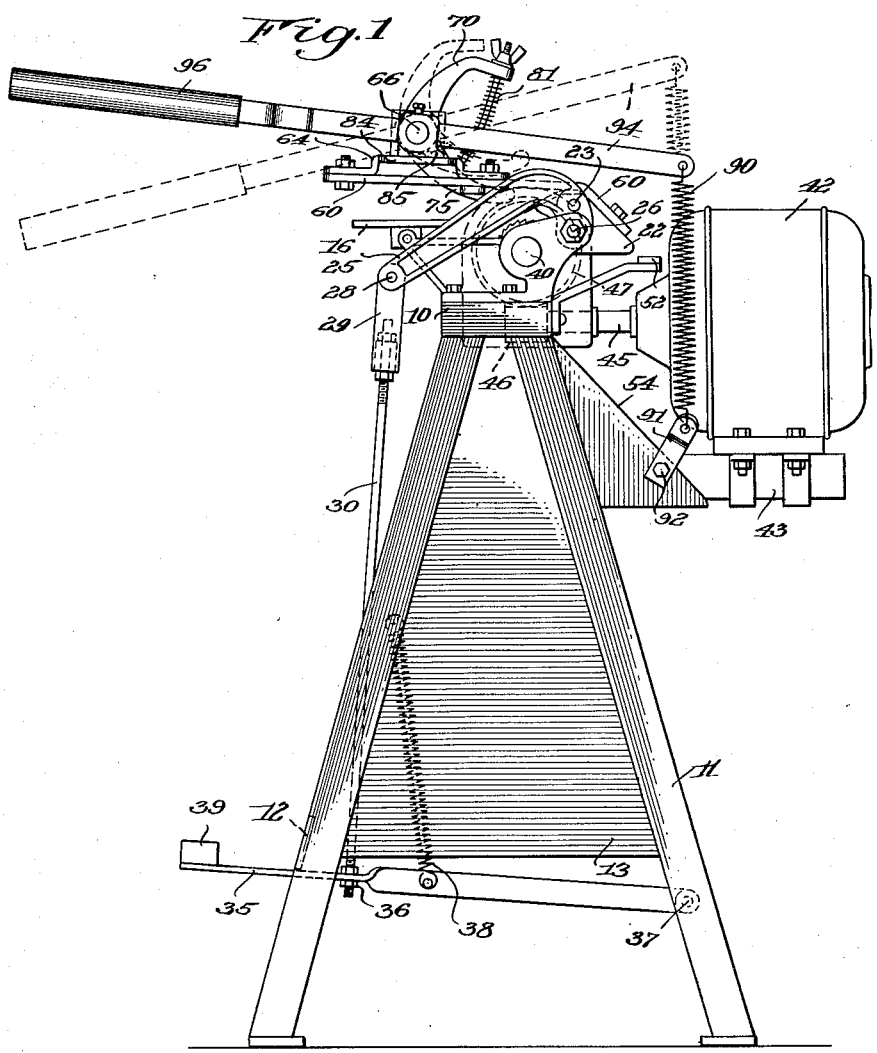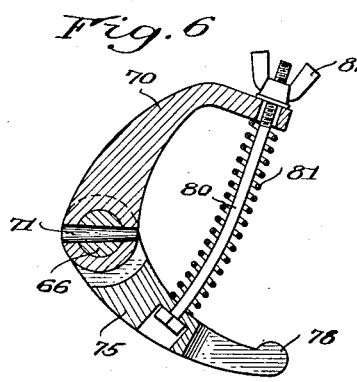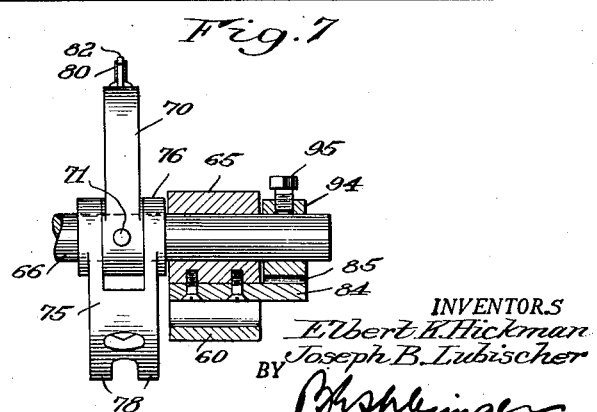

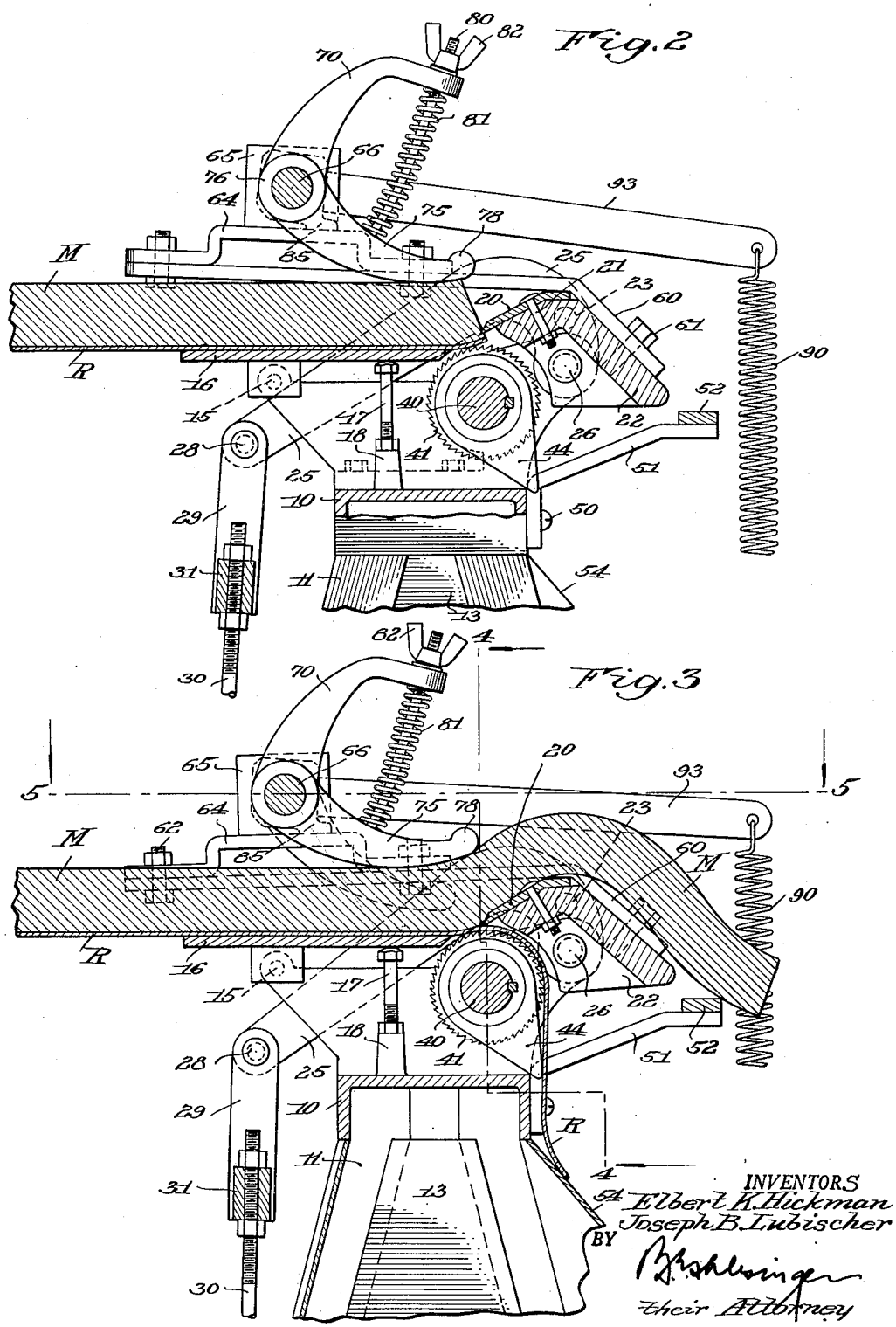

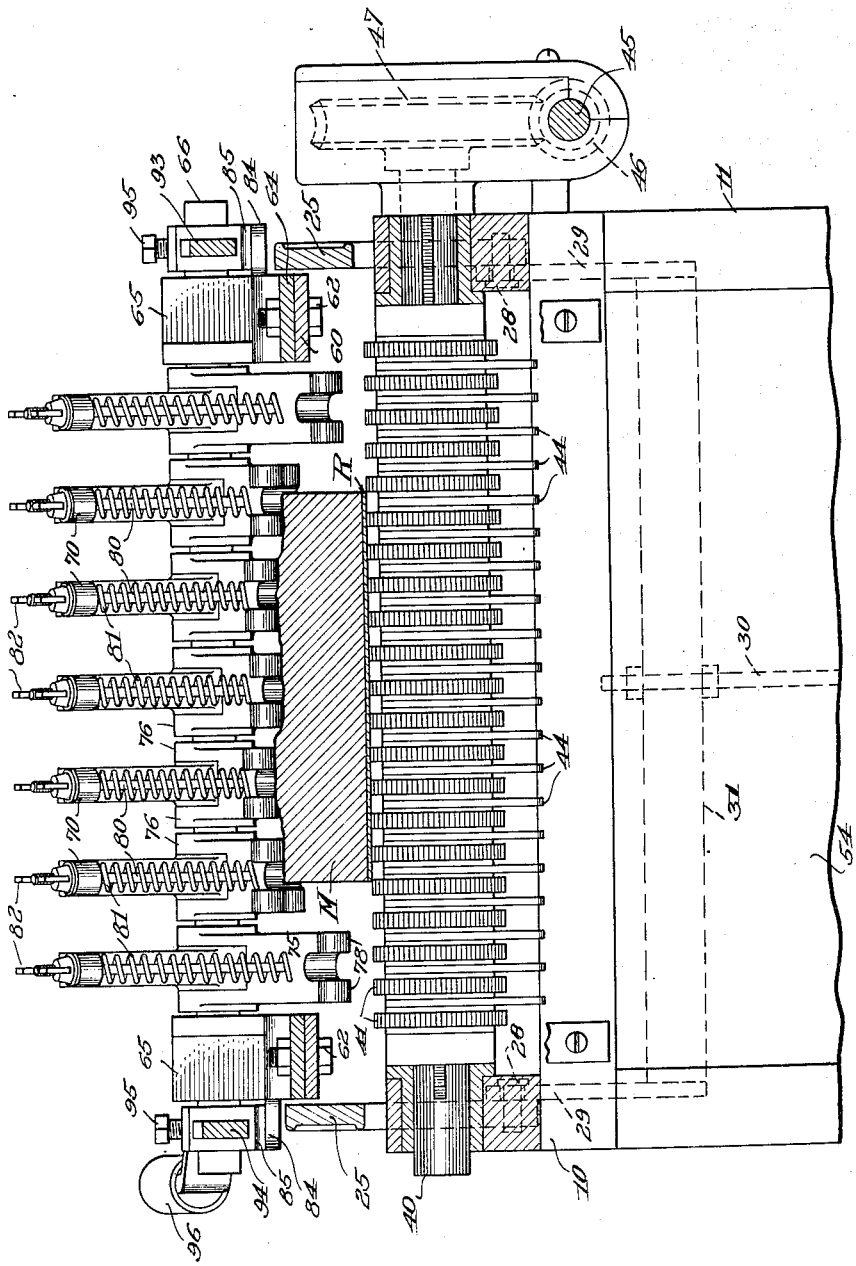

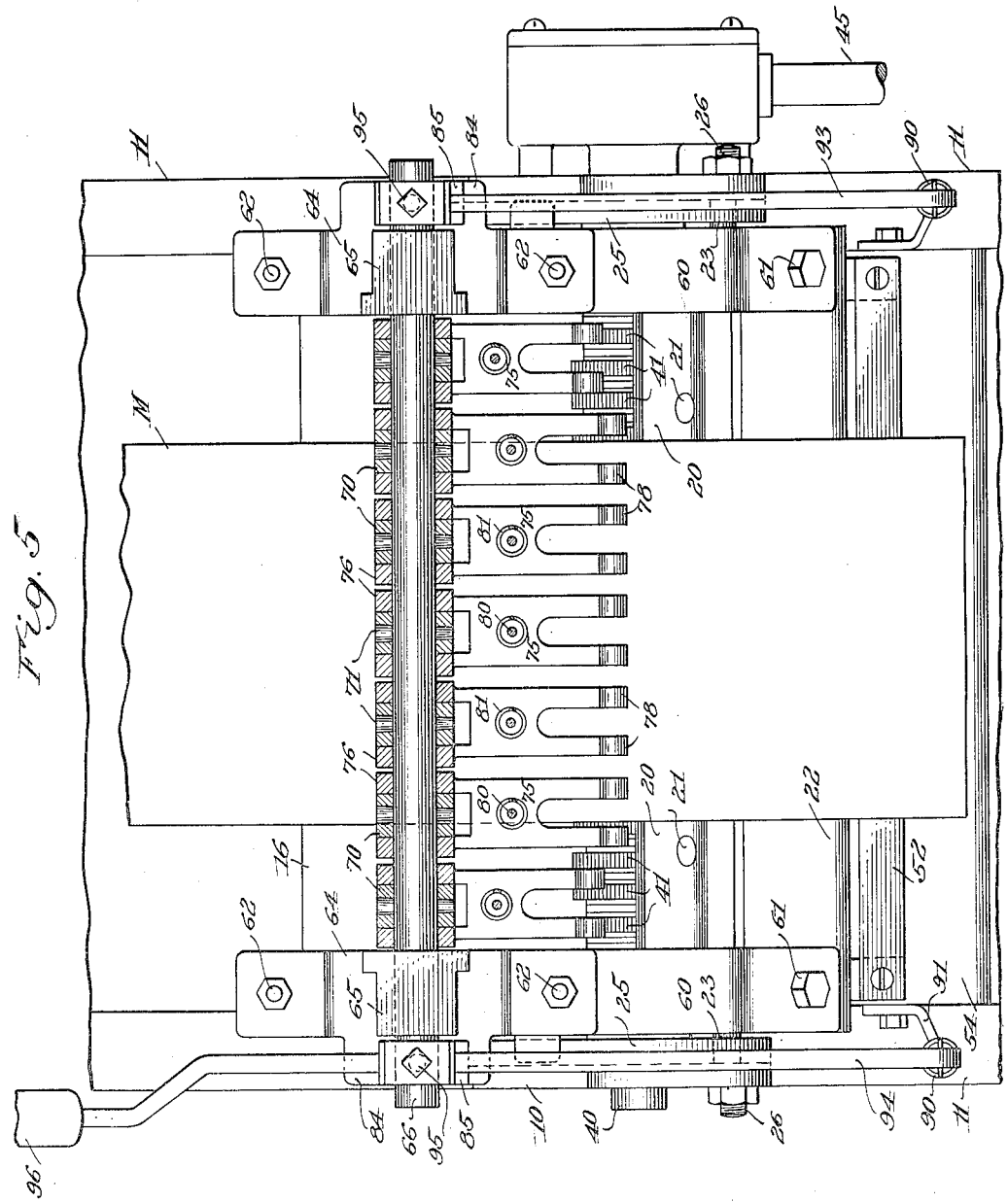

2,539,692

UNITED STATES PATENT OFFICE 2,539,692

MACHINE FOR SKINNING MEAT

Elbert K. Hickman, Brighton, and Joseph B. Lubischer, Rochester, N. Y.

Application September 16, 1946, Serial No. 697,242

11 Claims. (Cl. 146—130)

The present invention relates to apparatus for skinning pork products and particularly to apparatus for skinning or derinding smoked pork cuts such as bacon.

It is the practice in packing plants to skin both fresh and smoked pork products. The skinning or derinding has to be done carefully; otherwise there will be considerable waste of valuable meat product, for while the skin can be rendered to provide a product of value, its worth is much less than the worth of the edible portion of the meat.

Heretofore, separate types of machines have been required for skinning fresh and smoked pork products. The machines built for skinning fresh cuts, such as fat backs, shoulders, bellies, etc. will not take cuts of uniform thickness on bacon. Bacon rind is hard and stiff; the tissue of the bacon is firm and rigid; and slabs are not of uniform thickness. The machines either remove meat with rind or they do not take off the rind evenly. On the other hand, the machines which are built to derind bacon tend to dig in and take out too thick a cut if used for skinning a fresh pork product. In either case, if the machine is not used for the purpose for which it is built, it will not operate efficiently and a poor job is done or a lot of good meat is wasted. This means a serious loss, for in a packing plant a pork carcass is bought by the pound, and a loss in poundage of choice cuts means a serious loss in profits.

The primary object of the present invention is to provide a machine which can be used efficiently both for skinning fresh pork and derinding smoked pork.

Another object of the invention is to provide a machine which can be used for skinning either fresh or smoked pork and which will cost but little more than the machines heretofore built specifically for skinning soft pork and much less than the machines of previous constructions that have been built specifically for derinding bacon and other smoked pork products.

A still further object of the invention is to provide an attachment for a known type of fresh pork skinning machine which will permit of that machine being used to derind smoked pork also.

Other objects of the invention will be apparent hereinafter from the specification and from the recital of the appended claims.

In the drawings:

Fig. 1 is a side elevation of a conventional type of fresh pork skinning machine equipped with an attachment, constructed according to the present invention, which will permit of using this machine for derinding smoked pork products;

Fig. 2 is a fragmentary vertical sectional view on an enlarged scale showing the positions of the various parts of the machine at the beginning of an operation of derinding a slab of bacon;

Fig. 3 is a similar view but showing the positions of the parts after the slab of bacon has been fully clamped and during the progress of the derinding operation;

Fig. 4 is a sectional view on the line 4—4 of Fig. 3 showing how the resiliently mounted fingers operate to hold the bacon against the knife to secure a uniform thickness of derinding cut regardless of the cross-sectional shape of the slab of bacon;

Fig. 5 is a fragmentary sectional view on the line 5—5 of Fig. 3;

Fig. 6 is a detail view showing the structure and mounting of one of the spring-pressed fingers; and Fig. 7 is a view at right angles to Fig. 6 taken from the right of Fig. 6 and further illustrating the construction and mounting of the fingers and the manner in which the releasing handle is secured to the shaft on which the fingers are mounted.

In the drawings, we have shown how a known type of machine built for skinning fresh pork may be modified according to the present invention to permit the machine being used for derinding bacon and other smoked pork products. It is to be understood, however, that the invention is not limited to use on such a type machine.

The machine illustrated comprises a bed 10 which is supported by four legs 11 (Fig. 1), that are cross-braced as denoted at 12. The space between the legs is closed by side-plates 13. Pivotally mounted upon the bed 10, as by means of a pin 15, is a feed plate or rest 16 over which the slab of bacon or other product, which is to be skinned or derinded, is fed by toothed feed rolls 41 (Figs. 2 and 3) to the elongated cutting knife 20.

The plate or rest 16 is adapted to be adjusted angularly about its pivot 15 so that the meat to be skinned or derinded will engage feed rolls 41 at the correct angle. This adjustment is effected by rotation of stop-screw 17 which threads into a boss 18 formed on bed 10.

The knife 20 is adapted to be secured by bolts 21 to a rocker member 22. This member 22 is connected at opposite sides by means of pins 23 (Figs. 1, 2 and 3) to a pair of parallel lever arms 25. Each of these lever arms is pivoted at one end by means of a pin 26 to the framework 10.

The two lever arms 25 are pivotally connected at their opposite end by means of pins 28 (Figs. 1, 2, 3 and 4) with straps 29. These straps are secured to opposite ends of a bar 31 into which is threaded the upper end of the rod 30. The lower end of this rod passes through a treadle lever 35 and is operatively connected to the lever by means of nuts 36 which thread onto the rod at opposite sides of the treadle. The lever is pivotally connected at its inner end, as denoted at 37 to one of the legs 11 of the machine. A coil spring 38 whicch is connected at one end to the lever and at its opposite end to one of the legs 11 serves to normally hold the lever in its upper position as shown in Fig. 2 with the knife blade 20 released and spaced a considerable distance above feed rolls 41. When the operator of the machine pushes down on the treadle 39, however, he pulls the knife down from the position shown in Fig. 2 to that shown in Fig. 3 close to the feed rolls 41 where it will remove from the slab of pork, as the slab is fed over it, just the skin or rind.

Journaled in the framework 10 is a shaft 40 to which is keyed the toothed feed discs or rolls 41. These discs have relatively narrow faces, as shown in Fig. 4, and are provided with serrations around their peripheries as shown in Figs. 3 and 4 to bite into and grip the meat which is to be skinned. Between adjacent discs are mounted deflectors 44 to prevent the skin or rind from becoming wound around the rollers as it is cut from a slab. These deflectors have generally triangularly shaped noses, as shown clearly in Figs. 2 and 3 which rest against one corner of the bed 19.

The shaft 40 is adapted to be driven during operation of the machine from a motor 42 (Fig. 1) which is mounted upon a bracket 43 that is secured in any suitable manner to the supporting legs 11. The armature shaft 45 (Fig. 4) of the motor has a worm 46 secured to it which meshes with a worm wheel 47 that is secured to shaft 40. When the machine is in operation, then, the rolls or discs 41 are driven continuously, and they grip and feed the product, which is to be de-skinned, from the rest 16 to the knife blade 20 with the result that the skin or rind R, which is to be removed, is stripped from the product and is carried under the knife blade 20 while the edible portion M of the meat is carried over the blade.

Secured to the framework 10 as by means of screws 50 is a bracket 51 to which is fastened a guide plate 52 over which the de-skinned meat passes after the de-skinning operation, as shown in Fig. 3. An apron 54 (Fig. 3) which is secured to the framework 10 in any suitable manner serves to guide the bacon rind or skin into a suitable receptacle (not shown).

All of the machine, so far described, is of conventional construction. This machine is suited to skin fresh pork, but will not handle smoked pork efficiently. The attachment, which constitutes the present invention and which permits this machine to be used for derinding smoked pork, will now be described.

Fastened to the rocker member 22 by means of bolts 61 are a pair of spaced straps 60. Secured to the free ends of these straps 60, as by means of bolts 62, are other straps 64 which carry pillow-blocks 65. Journaled in these pillow-blocks is a shaft 66. Fastened to the shaft 66 as by means of pins 71 (Figs. 5 and 6) are a plurality of spaced arms 70. In the example shown, there are seven of these arms 70. Associated with each arm is a member 75. Each member 75 is bifurcated at one end to provide bearing portions 76 which straddle the member 70 and are rotatably journaled on the shaft 66. At its opposite end, each member 75 is also bifurcated to provide two contact fingers 78. Each of the arms 70 and the member 75, which is associated therewith, are resiliently connected to move together by a bolt 80 and a coil spring 81. The bolt 80 may be slightly bent, as shown in Fig. 6, and passes through openings in the finger member 75 and arm 70. The spring 81 surrounds the bolt and is interposed between the arm and the finger member. A butterfly nut 82, which threads onto the bolt 80 serves to permit adjustment of the tension of the spring.

The shaft 66 is biased in one direction about its axis by a pair of coil springs 90. Each of these springs is fastened at one end to a clip 91 (Fig. 1) that is secured by a screw 92 to the base of the machine. The two springs are secured at their opposite ends, respectively, to levers 93 and 94, respectively. These levers are fixedly secured to the shaft 66 by set-screws 95. Integral with the lever 94 is an operating handle 96.

The fingers 78 are adapted to engage and hold the slab, which is to be skinned, down against the feed rolls 41 and the knife 20. The pressure of the springs 81 is adjusted so that the slab will be straightened out, and the plurality of fingers adapt themselves to the contour of the meat so that its under face is held flat against the feed rolls, as clearly shown in Fig. 4. Hence, a uniform thickness of skin will be removed by the knife 20 as the slab is fed into the knife. The thickness of the skin removed can be controlled by adjustment of screws 17. Thus assurance can be had that the rind, and nothing but the rind is removed as the meat is fed into the knife, and that, moreover, the rind is taken off across the whole width of the slab of meat in one uniform cut.

The spring tension required on fingers 78 to effect the desired flattening out of the slab of meat is very considerable as will be seen from Fig. 4. In the instance shown the slab of meat, which is to be derinded, is narrower than the effective operating width of the machine with the result that the members 75 at the extreme right and extreme left do not engage the meat. These members are much lower than the other finger members because they are moved to the full limit of their downward movement by their springs 81. A stop member 85 (Fig. 7), which is secured to pillow-block 65 and which is adapted to engage a stop lug 85 that is fastened to lever 94 serves to limit downward movement of all the finger members. The finger member 75, which is shown at the extreme right in Fig. 4, is also shown in dotted lines in Fig. 3.

The clamping action of fingers 75 under pressure of springs 81 is aided by the springs 90 whose tension is increased when treadle 39 (Fig. 1) is pressed down to move knife 20 and with it finger members 75 from the inoperative position of Fig. 2 to the operative position of Fig. 3. The tension of the springs 90 and 81 is such, therefore, as to clamp the meat being derinded very tightly. The last extremity of the slab is, therefore, inclined to be held in the machine because of the tension exerted. To release this tension, the handle 96 (Fig. 1), which is secured to lever 94, may be depressed by the operator, causing the shaft 66 to be rocked about its axis in a counter-clockwise direction, as viewed in Fig. 1, rocking the fingers 78 upwardly in a counter-clockwise direction and disengaging them from the slab. The lever 94, arms 70 and finger members 75 are shown in full lines in Fig. 1 in operative position, and in dotted lines in disengaged position.

The operation of the machine will be understood from the preceding description, but may be briefly summed up here. To use the machine for skinning fresh pork products, the machine may be operated in known manner, and for this purpose the handle 96 may be depressed and, if desired, locked in depressed position, to hold the fingers 78 in inoperative position, for they are not required for holding fresh pork against feed rolls or knife. The pressure of the knife when moved from inoperative to operative position is sufficient for this purpose. To use the machine for derinding bacon, the fingers are allowed to assume their normal positions shown in full lines in Figs. 1 and 2. With the fingers in this position, the slab of meat, which is to be derinded, is pushed by the operator over the guide plate 16 into the machine until it engages the knife blade 20. Then the operator steps on the treadle 39, pulling the lever 25 downwardly about its pivot 26 and forcing the knife 20 forwardly and downwardly from the position shown in Fig. 2 to that shown in Fig. 3. This effectively engages the knife between the rind R and the edible portion M of the slab of meat. Simultaneously with the lowering of the knife, the strap members 60 are lowered, forcing the fingers 78 into clamping engagement with the upper face of the bacon slab. The springs 81 permit the several fingers to find their correct positions, as indicated in Fig. 4, so that the meat is held with sufficient pressure regardless of its shape and is held flat against the flat guide plate 16 and feed rolls 41 so that the knife 20 will remove a uniform thickness of rind from the bottom of the slab. If the screws 17 have been adjusted properly, this insures removal of nothing but the rind from the slab. The operator then starts motor 42. Revolving rollers 41 then feed the slab into the knife 20 and the knife removes the rind R. The rind falls down, as shown in Fig. 3, clear of the edible portion M of the meat which rides over the knife blade 20 and the rocker member 22 falling over the guide plate 52 into a proper receptacle, not shown. When the extreme end of the slab is reached, the operator lifts his foot off the treadle 39 releasing the knife, and depresses handle 96 to lift the gripping fingers 78 out of engaging operation.

Now while the invention has been described in connection with a particular embodiment thereof it will be understood that it is capable of modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described our invention, what we claim is:

1. In a machine for skinning meat, a knife, a rockable support on which the knife is mounted, a guide over which the meat is adapted to be fed into the knife, a feed roller mounted adjacent said guide to engage one side of a piece of meat to feed the meat into the knife, means for rocking the support to cause the knife to engage between the skin and the rest of the meat and to hold one side of the meat against the feed roller, and a plurality of spring-pressed fingers mounted on said support to be movable therewith and independently thereof and of one another and operable to press against the other side of the meat to flatten the first named side of the meat against the feed roller as the meat is fed into the knife by the roller.

2. In a machine for skinning meat, a rockable member, a knife blade secured to said member, a guide over which meat is adapted to be fed into the knife, a feed roller mounted to engage one surface of the meat to feed the meat into the knife, means for rocking the rockable member to cause the knife to engage between the skin and the rest of the meat and to hold one side of the meat against the feed roller, a support movably mounted on the rockable member, a plurality of spring-pressed fingers mounted on the support for pressing against the other side of the meat to flatten the first named side of the meat against the feed roller as the meat is fed into the knife, means for normally moving said support on the rockable member in a direction to apply greater pressure on said spring-pressed fingers, and means for moving the support in the opposite direction to move the spring-pressed fingers to released position.

3. In a machine for skinning meat, a rockable member, a knife blade secured to said member, a guide over which meat is adapted to be fed into the knife, a feed roller mounted to engage one surface of the meat to feed the meat into the knife, means for rocking the rockable member to cause the knife to engage between the skin and the rest of the meat and to hold one side of the meat against the feed roller, a plurality of gripping fingers mounted on the rockable member to be movable therewith and independently thereof, means for constantly urging the gripping fingers into operative position to press against the other side of the meat to flatten the first named side of the meat against the feed roller as the meat is fed into the knife, and separate means for resiliently urging all of said fingers as a unit together in such direction as to press against the second named side of the meat, and means for releasing the last named means.

4. In a machine for skinning meat, a knife, a rockable support to which the knife is secured, a guide over which the meat is adapted to be fed to the knife, a feed roller mounted adjacent said guide to engage one side of a piece of meat, means for rocking the support in one direction to cause the knife to engage between the skin and the rest of the meat and to hold one side of the meat against the feed roller, a shaft journaled in the support, a plurality of arms secured to the shaft in axially spaced relation, a plurality of gripping members journaled on the shaft, one of which is associated with each of the arms, springs interposed between each gripping member and its associated arm to constantly urge the gripping member into engagement with the other side of the meat to press the first named side of the meat against the feed roller, and means for rotating the roller to feed the meat into the knife.

5. In a machine for skinning meat, a knife, a rockable support to which the knife is secured, a guide over which the meat is adapted to be fed, a feed roller mounted adjacent said guide to engage one side of a piece of meat to feed the meat to the knife, means for rocking the support in one direction to cause the knife to engage between the skin and the rest of the meat and to hold one side of the meat against the feed roller, a shaft journaled in the support, a plurality of arms secured to the shaft in axially spaced relation, a plurality of gripping members journaled on the shaft, one of which is associated with each arm, springs interposed between the gripping members and the corresponding arms to constantly urge the gripping members in one direction about the axis of the shaft to engage the gripping members with the other side of the meat to press the first named side of the meat against the feed roller, means constantly urging the shaft in the same direction about its axis, means for rocking the shaft in the opposite direction, and means for rotating the roller to feed the meat into the knife.

6. In a machine for skinning meat, a support, a knife blade secured to said support, means for moving the support to move the knife blade to and from operative, meat-engaging position, means for engaging the meat at one side thereof to feed the meat into the knife blade when the blade is in operative position, a second support, a plurality of gripping members movably mounted on said second support, springs for actuating said gripping members into gripping position, and means connecting the first support to the second support to move said gripping members into position to engage the opposite side of the meat from the feed means when the knife blade is moved into engagement with the meat.

7. In a machine for skinning meat, a knife, a guide over which the meat is adapted to be fed into the knife, a support, a shaft journaled in said support, a feed roller mounted adjacent said guide to engage one side of the meat to feed the meat into the knife, a plurality of fingers rotatably mounted on the shaft and projecting therefrom so that they extend in the direction of feed of the meat, means for moving the support in one direction to move the fingers into engagement with the meat at the opposite side thereof from said feed roller, and means for resiliently urging the fingers in one direction about the axis of said shaft to cause the fingers to grip the meat at said opposite side when the support has been moved in said one direction.

8. In a machine for skinning meat, a knife blade, a guide over which the meat is adapted to be fed into the knife blade, a feed roller mounted to engage one side of the meat to feed the meat into the knife, a rockable support, a plurality of gripping fingers mounted on the rockable support to be movable therewith and independently thereof, means for moving the rockable support in one direction to move said gripping fingers into engagement with the meat, means for moving the gripping fingers individually independently of the support to press against the other side of the meat when said support has been moved in said one direction, to flatten the first-named side of the meat against the feed roller as the meat is fed into the knife, and separate means for resiliently urging all of said fingers as a unit together, independently of the support, in such direction as to press against the second-named side of the meat, when the support has been moved in said one direction, and means for releasing the last-named means.

9. In a machine for skinning meat, a knife, a guide over which the meat is adapted to be fed, a feed roller mounted adjacent said guide to engage one side of a piece of meat to feed the meat to the knife, a rockable support, a shaft journaled in the support, a plurality of arms secured to the shaft in axially spaced relation, a plurality of gripping members journaled on the shaft, one of which is associated with each arm, means for rocking the support in one direction to move the gripping members into engagement with the other side of the meat, and springs interposed between the gripping members and the corresponding arms to urge the gripping members individually constantly in one direction about the axis of the shaft to engage the gripping members resiliently with the said other side of the meat.

10. In a machine for skinning meat, a knife, a guide over which the meat is adapted to be fed, a feed roller mounted adjacent said guide to engage one side of a piece of meat to feed the meat to the knife, a rockable support, a shaft journaled in the support, a plurality of arms secured to the shaft in axially spaced relation, a plurality of gripping members journaled on the shaft, one of which is associated with each arm, means for rocking the support in one direction to move the gripping members into engagement with the other side of the meat, springs interposed between the gripping members and the corresponding arms to urge the gripping members individually constantly in one direction about the axis of the shaft to engage the gripping members resiliently with the said other side of the meat, means constantly urging the shaft in the same direction about its axis, means for rocking the shaft in the opposite direction, and means for rotating the roller to feed the meat into the knife.

11. In a skinning machine, a frame, a roller, arms pivoted on a horizontal axis on the frame, a pressure shoe supported in said arms, said pressure shoe cooperating with said roller to form a skinning means therewith, said pressure shoe being movable into operative relation with respect to said roller on downward movement of said arms, a table for supporting an object to be skinned in position for feeding the skin from the object between said roller and pressure shoe, hold down means supported above said table and adapted to be biased toward said table, means interconnecting said hold down means and said arms, and treadle means operable to move said arms downwardly.

ELBERT K. HICKMAN.
JOSEPH B. LUBISCHER.

REFERENCES CITED

The following references are of record in the file of this patent:

UNITED STATES PATENTS

| Number | Name | Date |
|---|---|---|
| 181,486 | Settle | Aug. 22, 1876 |
| 897,204 | Hathaway | Aug. 25, 1908 |
| 1,334,694 | Defresne et al. | Mar. 23, 1920 |
| 1,376,810 | Hieatzman | May 3, 1921 |
| 1,416,723 | Krafft | May 23, 1922 |
| 1,544,339 | Oderman | June 30, 1925 |
| 1,847,536 | Pruefer | Mar. 1, 1932 |
| 2,023,530 | Kelly | Dec. 10, 1935 |
| 2,155,730 | Miller | Apr. 25, 1939 |
| 2,280,059 | Brustowsky | Apr. 21, 1942 |
| 2,455,831 | Townsend | Dec. 7, 1948 |

FOREIGN PATENTS

| Number | Country | Date |
|---|---|---|
| 619,131 | France | Dec. 27, 1926 |